United States Patent [19]

Joklik

[11] Patent Number: 4,857,204
[45] Date of Patent: Aug. 15, 1989

[54] METHOD OF AN APPARATUS FOR STERILIZING AQUEOUS MEDIA, MORE PARTICULARLY DRINKING WATER

[76] Inventor: Otto F. Joklik, Gersthofer Strasse 120, A-1180 Wien, Austria

[21] Appl. No.: 120,900

[22] Filed: Nov. 16, 1987

[30] Foreign Application Priority Data

Nov. 17, 1986 [AU] Australia .............................. 3045/86

[51] Int. Cl.$^4$ .......................... C02F 1/32; C02F 1/48; C02F 1/78
[52] U.S. Cl. .................................... 210/695; 204/155; 204/157.15; 204/158.2; 210/149; 210/220; 210/222; 210/223; 210/416.1; 210/748; 210/760; 210/764; 422/24; 422/29; 422/186.01; 422/186.08; 422/186.1; 422/186.2; 422/186.3
[58] Field of Search ...................... 210/149, 198.1, 222, 210/223, 416.1, 416.3, 695, 742, 748, 758, 760, 764, 220; 204/155, 157.15, 158.2; 422/22, 186.01, 186.3, 186.08, 186.1, 186.2, 24, 29

[56] References Cited

U.S. PATENT DOCUMENTS

| | | | |
|---|---|---|---|
| 3,551,091 | 12/1970 | Veloz | 210/192 |
| 3,929,433 | 12/1975 | Lucero | 210/222 |
| 4,214,962 | 7/1980 | Pincon | 210/760 |
| 4,265,747 | 5/1981 | Copa et al. | 210/760 |
| 4,412,924 | 11/1983 | Feather | 210/760 |
| 4,563,286 | 1/1986 | Johnson et al. | 210/760 |

FOREIGN PATENT DOCUMENTS

| | | |
|---|---|---|
| 2003989 | 8/1971 | Fed. Rep. of Germany . |
| 2327084 | 12/1974 | Fed. Rep. of Germany . |
| 2851013 | 5/1980 | Fed. Rep. of Germany . |
| 2856537 | 7/1980 | Fed. Rep. of Germany . |
| 3309021 | 9/1984 | Fed. Rep. of Germany . |
| 3441535 | 6/1986 | Fed. Rep. of Germany . |
| WO83/02937 | 9/1983 | PCT Int'l Appl. . |

Primary Examiner—W. Gary Jones
Attorney, Agent, or Firm—Herbert Dubno

[57] ABSTRACT

A method and apparatus according to the invention provide for the use of ultraviolet radiation in combination with a magnetic field, whereby improved purification of the aqueous medium is achieved.

16 Claims, 3 Drawing Sheets

METHOD OF AN APPARATUS FOR STERILIZING AQUEOUS MEDIA, MORE PARTICULARLY DRINKING WATER

The invention relates to a method and an apparatus for sterilizing aqueous media, more particularly drinking water, by means of ultraviolet radiation.

The sterilizing action of ultraviolet rays has long been known. In this connection reference is made to U.S. Pat. No. 3,551,091, German Pat. No. 28 51 013 and German Pat. No. 23 27 084.

It is the purpose of the invention to improve the efficiency of the treatment, more particularly the sterilization, of aqueous media.

According to the invention, this purpose is accomplished by a combination of ultraviolet irradiation and an artifically produced magnetic field. By means of simultaneous action of ultraviolet rays of suitable wavelength and magnetic fields, improved purification of the aqueous medium is achieved.

The appliance according to the invention for the implmentation of the method according to the invention comprises a device for producing ultraviolet rays and a device for producing a magnetic field, the said devices being combined in such a manner that the area provided in the appliance for sterilizing the aqueous medium may be exposed simultaneously to the action of the ultraviolet rays and of the magnetic field, at least one, preferably three to ten permanent magnets being provided for producing the said magnetic field. However, in the case of large, preferably stationary units, the magnetic field may also be provided by one or more electromagnets. The number of magnets may vary according to the strength and arrangement thereof. The magnets may be arranged in the same direction with a south pole associated with a north pole, but if the flow is through non-homogeneous fields, they are preferably arranged in opposite directions, i.e. south pole to south pole and north pole to north pole.

The sterilizing action of the method according to the invention may be augmented by ozonizing the aqueous medium. The appliance according to the invention therefore preferably comprises a device for ozonizing the aqueous medium. This device preferably treats the ozone arising during ultraviolet irradiation of the aqueous medium. According to a preferred configuration, the ozonizing device follows the devices for producing ultraviolet rays and the magnetic field. In this way, the aqueous medium is first exposed to ultraviolet radiation and to the magnetic field and is then ozonized. The ozonizing may, with advantage, also be linked to the action of a further magnetic field, for the production of which the said ozonizing device may also be provided with a separate device for producing a magnetic field, this latter device preferably consisting of at least one permanent magnet.

The sterilizing action of the method according to the invention may be still further increased by cooling or heating the medium to be sterilized, depending upon its initial temperature. The appliance for the implementation of the method according to the invention therefore comprises, with advantage, an apparatus for selectively cooling or heating the aqueous medium and, if necessary, this may be combined with the ozonizing device.

The appliance for the implementation of the method according to the invention may be connected to a pressure line through which the aqueous medium to be sterilized flows, so that the said medium passes through the appliance. In order to produce pressure, the appliance may also comprise a manually operable pump. This pump may be put to use in the event of batchwise operations, when only a limited amount of liquid is to be sterilized and released.

The appliance according to the invention may comprise a source of power independent of the mains (battery, accumulator, solar cells, etc), so that at least the UV source is independent of the network and the entire appliance can therefore be used without an outside source of power, for example in inaccessible country.

In the appliance according to the invention, the device for producing ultraviolet rays is preferably arranged in an elongated quartz-glass tube surrounded by at least one annular permanent magnet arranged coaxially therewith, the axial length of the said permanent magnet preferably amounting to at least 3 mm and, as a rule, to between 5 and 10 mm. The efficiency of this device for producing ultraviolet rays may be substantially increased by a guide means which surrounds the quartz-glass tube, and preferably the annular permanent magnet also, coaxially and ensures that the aqueous medium passes along substantially the complete operative length of the quartz-glass tube. The annular permanent magnets provided for producing the magnetic field are such that, and are arranged in such a manner that, their internal and/or external peripheries are swept around and through by the aqueous medium. According to a preferred example of embodiment, annular permanent magnets are provided, the radial dimensions of which are such that the flow is alternately through the interior and around the outside, so that, during the sterilization process, the aqueous medium to be sterilized is constantly forced to change direction. This provides thorough mixing.

The aforesaid guide means may, with advantage, be annular; it is preferably made of quartz glass or of a synthetic material pervious to ultraviolet rays, so that the aqueous medium, flowing round the outside of the guide means, is exposed to additional ultraviolet irradiation.

The appliance according to the invention may also comprise a filter element surrounding the guide means at a distance therefrom, an inlet for the aqueous medium opening in the space between the appliance housing and the said filter element. A filter element of this kind is used to prevent coarse impurities from reaching the interior of the appliance which is intended to sterilize the aqueous medium by ultraviolet irradiation and a magnetic field. It is also possible to provide filters, especially activated charcoal filters, before or after the ultraviolet light and magnetic treatments.

The invention is especially intended for the treatment of water suitable for drinking. It is also suitable for water provided for the germ-free cleaning of objects. It may also be used very advantageously for sterilizing beverages such as those stored and dispensed in the open air, for example. Continuous dispensing of the treated aqueous medium is possible, with or without interruption.

The following examples show how the sterilization action may be increased by combining ultraviolet irradiation with a magnetic field.

EXAMPLE 1

Water sterilization with an 8-watt UV-C radiation source without a magnetic field—survey of individual tests and results.

| Test germ | E. coli | | Ps. aeruginosa | |
|---|---|---|---|---|
| Test series | (I) | (III) | (II) | (IV) |
| Test germ suspension KBE/ml | $2 \times 10^8$ | $2 \times 10^9$ | $3 \times 10^7$ | $2 \times 10^9$ |
| Water sample KBE/ml | $2 \times 10^5$ | $2 \times 10^5$ | $7 \times 10^4$ | $3 \times 10^5$ |

| | Germ growth after sterilization (KBE/ml) by means of membrane filtration of 100 ml and incubating at | | | | | | | |
|---|---|---|---|---|---|---|---|---|
| | 37° C. | | | | 42° C. | | | |
| | 24 h | 48 h | 24 h | 48 h | 24 h | 48 h | 24 h | 48 h |
| Flow velocity | | | | | | | | |
| 1 l/min | 0 | 0 | 0 | 0 | 0 | 0 | 0 | 0 |
| 2 l/min | 0 | 0 | 0 | 0 | 0 | 0 | 0 | 0 |
| 4 l/min | 0 | 0 | 0 | 0 | 0 | 0 | 0 | 0 |
| 8 l/min | 0 | 0 | 0 | 0 | 0 | 0 | 0 | 0 |

| | Germ count after sterilization (KBE/ml) by means of the cast plate process and incubating at 37° C. during 48 hours | | | | | | | |
|---|---|---|---|---|---|---|---|---|
| | 0.1 ml | 1 ml | 0.1 ml | 1 ml | 0.1 ml | 1 ml | 0.1 ml | 1 ml |
| Flow velocity | | | | | | | | |
| 1 l/min | 0 | 0 | 0 | 0 | 0 | 0 | 0 | 0 |
| 2 l/min | 0 | 0 | 0 | 0 | 0 | 0 | 0 | 0 |
| 4 l/min | 0 | 0 | 0 | 0 | 0 | 0 | 0 | 0 |
| 8 l/min | 0 | 0 | 0 | 0 | 0 | 0 | 0 | 0 |

Complete sterilization action is limited to a flow velocity of 8 l/min. If the flow velocity is increased, germs are carried along.

EXAMPLE 2

Water sterilization with a 6-watt UV-C radiation source with a magnetic field—survey of individual tests and results.

| Test germ | E. coli | | Ps. aeruginosa | |
|---|---|---|---|---|
| Test series | (I) | (III) | (II) | (IV) |
| Test germ suspension KBE/ml | $2 \times 10^8$ | $2 \times 10^9$ | $3 \times 10^7$ | $2 \times 10^9$ |
| Water sample KBE/ml | $2 \times 10^5$ | $2 \times 10^5$ | $7 \times 10^4$ | $3 \times 10^5$ |

| | Germ growth after sterilization (KBE/ml) by means of membrane filtration of 100 ml and incubating at | | | | | | | |
|---|---|---|---|---|---|---|---|---|
| | 37° C. | | | | 42° C. | | | |
| | 24 h | 48 h | 24 h | 48 h | 24 h | 48 h | 24 h | 48 h |
| Flow velocity | | | | | | | | |
| 8 l/min | 0 | 0 | 0 | 0 | 0 | 0 | 0 | 0 |
| 10 l/min | 0 | 0 | 0 | 0 | 0 | 0 | 0 | 0 |

| | Germ count after sterilization (KBE/ml) by means of the cast plate process and incubating at 37° C. during 48 hours | | | | | | | |
|---|---|---|---|---|---|---|---|---|
| | 0.1 ml | 1 ml | 0.1 ml | 1 ml | 0.1 ml | 1 ml | 0.1 ml | 1 ml |
| Flow velocity | | | | | | | | |
| 8 l/min | 0 | 0 | 0 | 0 | 0 | 0 | 0 | 0 |
| 10 l/min | 0 | 0 | 0 | 0 | 0 | 0 | 0 | 0 |

This Example 2 shows that despite a 25% reduction in the UV-C radiation source, the flow velocity may be considerably increased without any germs being flushed out.

EXAMPLE 3

Experiment with the water-sterilization appliance with a 6-watt UV-C radiation source in a magnetic field.

| 1. | Germs | 16-hour bouillon culture of E. coli 16-hour bouillon culture of Ps. aeruginosa |
|---|---|---|
| 2. | Germ addition | 20 ml of germ suspension were added to 20 ml of tap water. An experiment with a germ suspension diluted 1:10 and with an undiluted germ suspension. KBE/ml out of the water container after addition of the germ suspension: |
| | | E. coli (diluted 1:10)    $2 \times 10^5$ |
| | | E. coli (undiluted)    $3 \times 10^7$ |
| | | Pseudomonas aeruginosa (1:10)    $1 \times 10^4$ |
| | | Pseudomonas aeruginosa (undiluted)    $1 \times 10^6$ |
| 3. | Results | After passing through the appliance amount passing through 10 l/min KBE/1 mil: |
| | | E. coli (1:10)    0 |
| | | E. coli (undiluted)    0 |
| | | Ps. aeruginosa (1:10)    0 |
| | | Ps. aeruginosa (undiluted)    2 |

The first series of experiments was carried out with an 8-watt UV sterilizing burner and with a 220 V 50 Hz stray field transformer without permanent magnets.

The second series of experiments was carried out with a 6-watt UV sterilizing burner with a 12 V 12 kHz power supply and with permanent magnets in the ultraviolet radiation area.

A comparison of the results shows that the results obtained with a 6-watt UV sterilizing burner in a magnetic field are significantly better than those obtained with an 8-watt UV sterilizing burner alone with no magnetic field in the ultraviolet radiation area.

Further details, characteristics and advantages of the invention, which may be realized alone or in combination in an example of embodiment of the invention, may be gathered from the claims and from the following description of preferred examples of the invention in conjunction with the diagrammatical drawings attached hereto, wherein:

Figure 1:
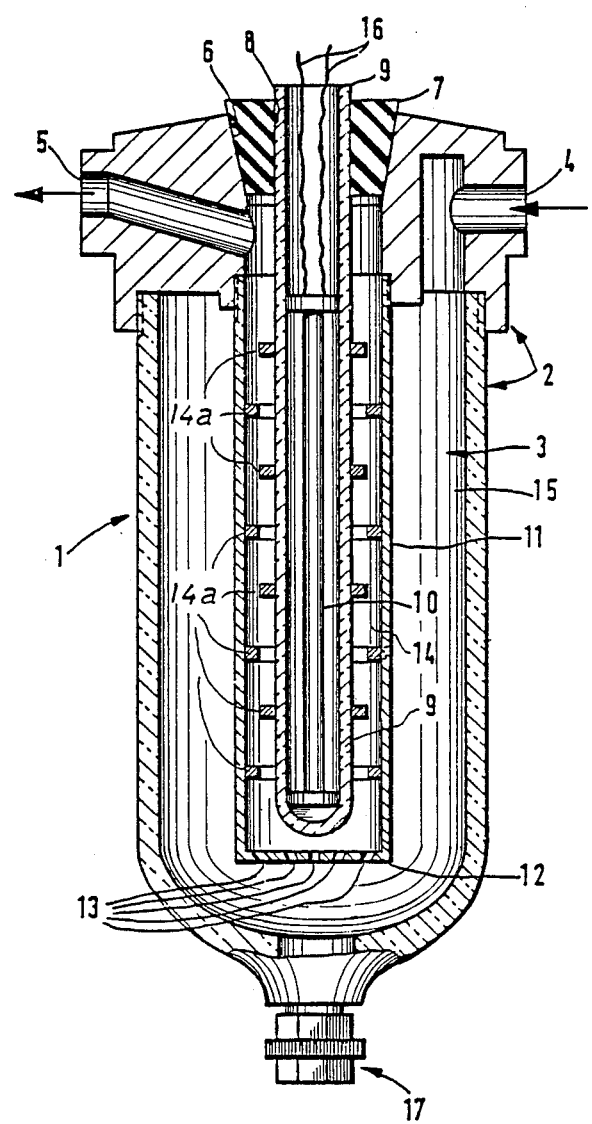
FIG. 1 is a longitudinal section through an appliance according to the invention.

Appliance 1, illustrated in FIG. 1, is suitable for sterilizing water and beverages and comprises a housing 2, interior 3 of which is connected to a water inlet 4 and a water outlet 5. Inserted into a conical opening 6 in housing 2 is a rubber plug 7 having a central bore 8. Held in bore 8 is a quartz-glass tube 9 which extends into interior 3 and accommodates an elongated UV-radiation source 10 coaxially.

A coaxial guide tube 11, screwed into housing 2, also extends into interior 3; endwall 12 of the said tube comprising directional apertures 13 for water flowing threinto. Located between guide tube 11 and quartz-glass tube 9 is a space 14 and between guide tube 11 and housing 2 there is a space 15.

UV radiation source 10 is supplied with power through electrical leads 16.

Located in space 14 are eight annular permanent magnets 14a which are swept by the water flowing through guide tube 11.

At its lowermost point, housing 2 is provided with an outlet 17 used for cleaning appliance 1.

Figure 2:
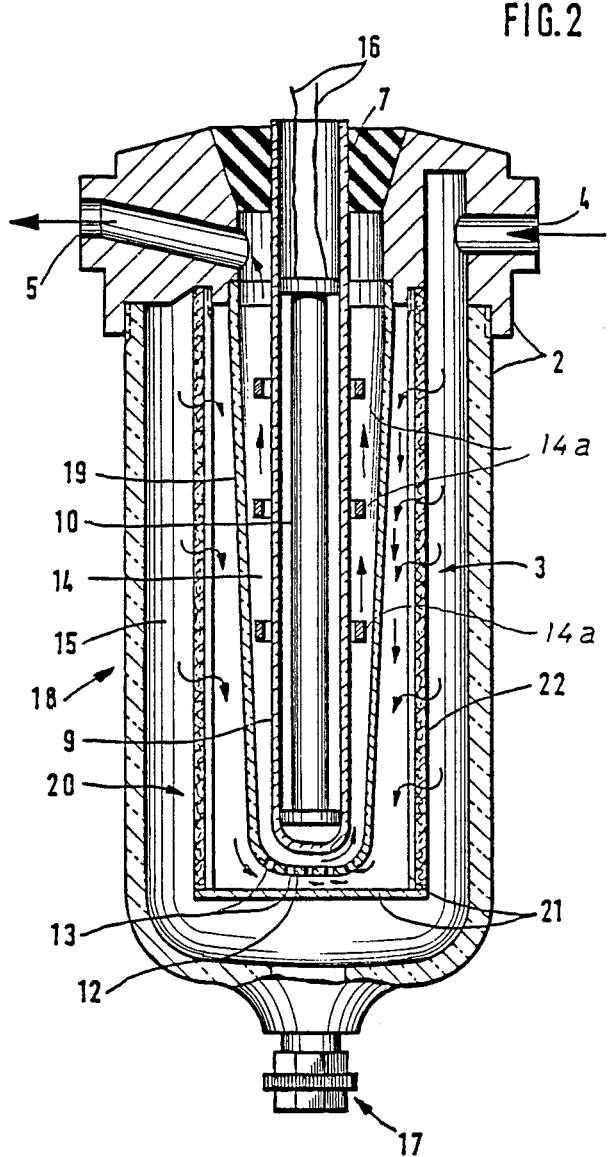
FIG. 2 is a longitudinal section through another appliance according to the invention.
Figure 3:
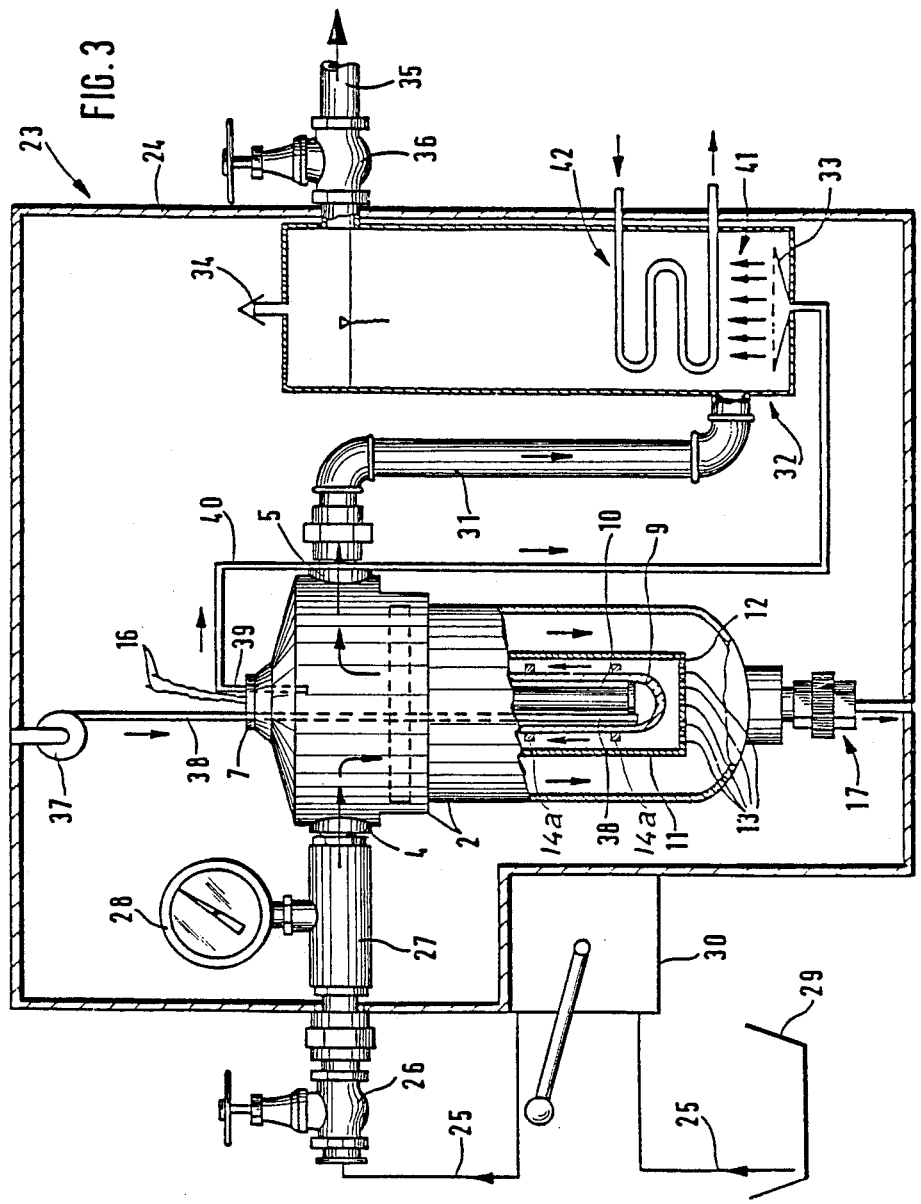
FIG. 3 is a partly sectioned view of still another appliance according to the invention.

In FIGS. 2 and 3, parts corresponding to parts shown in FIG. 1 bear corresponding reference numerals.

FIG. 2 shows a modified appliance 18 for sterilizing water. Whereas tubular guide means 11 shown in FIG. 1 is made of sheet metal, guide means 19 in FIG. 2 is conical and is made of quartz glass. Arranged in space 15, between the said guide means and the housing, is a filter element 20 which surrounds the said guide means, is spaced from it and from housing 2, and is screwed into the upper part of the latter. Filter element 20 comprises a supporting basket 21 the casing of which is permeable to water and carries a hollow cylinder 22 made out of filter material. The medium to be sterilized, for example water, flows through the appliance 18 in the direction of the arrows shown in FIG. 2.

FIG. 3 shows a portable appliance 23 for sterilizing water. In an external housing 24 of this appliance a line 25 for untreated water, comprising a manually operated valve 26 and a magnetic valve 27 connected to a manometer 28, runs to the water inlet into housing 2. The said line may be connected to any desired source of untreated water. Connected into line 25 is a hand pump 30 which is secured to housing 24 and which allows water to be passed through the appliance when a mains supply of electricity is not available.

The ultraviolet irradiated water passes from outlet 5 in housing 2, through a line 31, to an ozonizing container 32 arranged in external housing 24, the lower end of the said container being provided with a nozzle head 33 while the upper end is fitted with a vent 34. The sterilized water leaves ozonizing container 32 through a line 35 carrying a manually operated valve 36.

Also arranged in external housing 24 is a compressor 37 which draws air from the outside and forces it through a pipe 38 into the lower part of the interior of quartz-glass tube 9. The air flows thence upwardly along ultraviolet radiation source 10 and is thus ozonized. The ozonized air leaves quartz-glass tube 9 through a pipe 39 which is connected, through a line 40, to nozzle head 33 in ozonizing container 32. The ozonized air leaves nozzle head 33 and bubbles, in the direction of arrow 41, through the ultraviolet irradiated and sterilized water in ozonizing container 32. Pipes 38 and 39 pass sealingly through rubber plug 7.

Ozonizing container 32 is provided with a temperature regulating device 42 which allows the sterilized water in the said container to be cooled or heated.

Magnetic valve 27 may be wired in such a manner that it closes automatically in the event of an electrical power failure to source 10 of ultraviolet radiation or of a fault therein, thus automatically shutting down the whole of appliance 23. This prevents inadequate sterilization of untreated water from passing unobserved.

Guide means 11,19, and supporting basket 21, may be made out of a transparent material, thus providing an optical check of the servicability of the appliance when it is switched on, since ultraviolet radiation is then visible at the said supporting basket.

In the example of embodiment according to FIG. 1 there is a total of eight annular permanent magnets 14a. The axial thickness of these magnets is the same, but they differ from each other as regards their other dimensions and arrangement. Some of these magnets bear against the outer wall of quartz-glass tube 9 while others bear against the inner wall of the tubular guide means. The poles of the magnets are arranged in opposite directions to each other.

Provided in the example of embodiment according to FIG. 2 are three annular permanent magnets 14a arranged in the same direction, the dimensions and arrangement of the said magnets being such that a space remains between them, quartz-glass tube 9, and conical guide means 19, through which parts of the medium to be sterilized may flow.

In the example of embodiment according to FIG. 3, for the sake of clarity only two of the three annular permanent magnets 14a are shown, each of them bearing against the outside of quartz-glass tube 9. The aqueous medium therefore flows around them.

I claim:

1. An apparatus for sterilizing an aqueous medium comprising:
    means for passing an aqueous medium along a path;
    means along said path for producing ultraviolet rays and subjecting said aqueous medium to said ultraviolet rays; and
    means along said path in a region in which said aqueous medium is subject to said ultraviolet rays for subjecting said aqueous medium, while it is subjected to said ultraviolet rays, to a magnetic field, said means for subjecting said aqueous medium to said magnetic field including a plurality of magnets having poles arranged in opposite directions to one another.

2. The apparatus defined in claim 1 wherein said means for subjecting said medium to said magnetic field comprises a plurality of permanent magnets along said path.

3. The apparatus defined in claim 1, further comprising means along said path for ozonizing the aqueous medium.

4. The apparatus defined in claim 1, further comprising means for controlling the temperature of the aqueous medium.

5. The apparatus defined in claim 4 wherein the means for subjecting said aqueous medium to said magnetic field comprises a plurality of annular permanent magnets.

6. The apparatus defined in claim 1 wherein said means for passing said aqueous medium along said path includes a pump displacing said aqueous medium.

7. The apparatus defined in claim 6, further comprising an ozonizing device for ozonizing said aqueous medium.

8. The apparatus defined in claim 6 wherein said pump is manually operable.

9. The apparatus defined in claim 1, further comprising a source of electric power independent of line current connected to said means for subjecting said aqueous means to said ultraviolet rays.

10. The apparatus defined in claim 1 wherein said means for subjecting said aqueous means to ultraviolet rays includes a quartz glass ultraviolet-ray-generating tube surrounded by said plurality of permanent magnets including at least one permanent magnet disposed coaxially therewith.

11. The apparatus defined in claim 10 wherein said path is defined by a guide means surrounding the quartz glass tube coaxially and guiding said aqueous medium over substantially the entire length of said quartz glass tube.

12. The apparatus defined in claim 11 wherein a filter element surrounds but is spaced from said guide means, the inlet for said aqueous medium opening into a space within the housing of said apparatus and said filter element.

13. The apparatus defined in claim 11 wherein said permanent magnets have an axial length of at least 3 mm.

14. The apparatus defined in claim 1 wherein said means for subjecting said aqueous medium to said magnetic field is an annular array of said permanent magnets and guide means for passing said aqueous medium along at least one of the peripheries of said array of permanent magnets.

15. The apparatus defined in claim 14 wherein said guide means also surrounds said annular array of permanent magnets coaxially.

16. The apparatus defined in claim 1 wherein the means for passing said aqueous medium along said path includes a substantially tubular guide composed of quartz-glass or a synthetic material pervious to ultraviolet rays.

* * * * *